US007486285B2

(12) United States Patent
Jo et al.

(10) Patent No.: US 7,486,285 B2

(45) Date of Patent: Feb. 3, 2009

(54) DA CONVERTER, DATA LINE DRIVING CIRCUIT, ELECTRO-OPTICAL DEVICE, DRIVING METHOD THEREOF, AND ELECTRONIC APPARATUS

(75) Inventors: Hiroaki Jo, Suwa (JP); Toshiyuki Kasai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 658 days.

(21) Appl. No.: 11/104,578

(22) Filed: Apr. 13, 2005

(65) Prior Publication Data

US 2005/0270205 A1 Dec. 8, 2005

(30) Foreign Application Priority Data

May 24, 2004 (JP) ............................ 2004-153278

(51) Int. Cl.
*H02M 11/00* (2006.01)
*G06F 3/038* (2006.01)

(52) U.S. Cl. ...................................... 345/204; 327/103

(58) Field of Classification Search ................... 345/76, 345/77, 204; 327/103
See application file for complete search history.

(56) References Cited

U.S. PATENT DOCUMENTS 5,619,203 A 4/1997 Gross, Jr. et al.
6,332,661 B1 12/2001 Yamaguchi
6,362,798 B1 3/2002 Kimura et al.
2004/0041776 A1 3/2004 Yokokawa
2005/0140598 A1* 6/2005 Kim et al. ...................... 345/76
2005/0225518 A1* 10/2005 Yamada et al. ................ 345/77
2006/0119552 A1 6/2006 Yumoto

FOREIGN PATENT DOCUMENTS

| | | |
|---|---|---|
| CN | 1477432 A | 2/2004 |
| JP | U-64-010816 | 1/1989 |
| JP | U-01-064716 | 4/1989 |
| JP | A-05-173613 | 7/1993 |
| JP | A-08-213911 | 8/1996 |
| JP | A 11-272233 | 10/1999 |
| JP | A-2000-293245 | 10/2000 |
| JP | A-2003-044002 | 2/2003 |
| JP | A 2003-157051 | 5/2003 |
| JP | A 2003-195815 | 7/2003 |
| KR | A 2003-20832 | 3/2003 |

* cited by examiner

*Primary Examiner*—Amr Awad
*Assistant Examiner*—Randal Willis
(74) *Attorney, Agent, or Firm*—Oliff & Berridge, PLC

(57) ABSTRACT

To simplify s configuration of a current mode DA converter. A data line driving circuit includes DA converting units U1 to Un. Each DA converting unit U1 to Un a voltage DA converting circuit for generating an analog voltage signal Sv based on image data, a V/I converting circuit for converting the analog voltage signal Sv into an analog current signal Si, and a voltage current selector for selecting one of the analog voltage signal Sv and the analog current signal Si based on a pre-charge control signal CTL. In addition, the analog voltage signal Sv outputted from the voltage current selector serves as a pre-charge voltage, and the analog current signal Si serves as a driving current of an OLED element.

8 Claims, 9 Drawing Sheets

DA CONVERTER, DATA LINE DRIVING CIRCUIT, ELECTRO-OPTICAL DEVICE, DRIVING METHOD THEREOF, AND ELECTRONIC APPARATUS

BACKGROUND

The present invention relates to a DA converter, a data line driving circuit, an electro-optical device, a driving method thereof, and an electronic apparatus.

As an electro-optical device replacing a liquid crystal display device, a great attention is paid to a device including an organic light emitting diode (OLED) element. The OLED element acts as a diode from an electrical point of view. From an optical point of view, the OLED element emits light when it is forwardly biased, and the amount of light emission is increased in proportion to the increase of a forward bias current.

An electro-optical device having OLED elements arranged in the form of a matrix includes a plurality of scan lines, a plurality of data lines, and pixel circuits provided respectively at intersections of the scan lines and the data lines. Each pixel circuit serves to store a value of current supplied from a respective data line and supply a driving current to a respective OLED element such that the respective OLED element has the stored value of current.

Such an electro-optical device includes a data line driving circuit for supplying current signals according to gray-scale levels to be represented for the plurality data lines. The data line driving circuit typically includes a plurality of current mode digital to analog (DA) converters corresponding to the plurality of data lines. There is a case where the current mode DA converters, each including a plurality of current sources using current mirror circuits, select output signals of the current sources based on a digital signal value and output the selected output signals as current signals (for example, see Patent Document 1).

In addition, since the data lines are accompanied with stray capacitance, there is a case where pre-charge voltages are supplied to the data lines before current signals are supplied to the data lines (for example, see Patent Document 2). In this case, the data line driving circuit is required to include a special circuit for supplying a pre-charge voltage, in addition to the current mode DA converter.

[Patent Document 1] Japanese Unexamined Patent Application Publication No. 2000-293245.

[Patent Document 2] Japanese Unexamined Patent Application Publication No. 2003-44002.

SUMMARY

However, since such conventional current mode DA converters are required to include the current sources corresponding to the number of bits of the digital signal, configuration thereof becomes complicated. In addition, when the data line driving circuit includes the plurality of current mode DA converters, since the plurality of current sources are required to be equipped for each current mode DA converter, there is a problem in that deviations of characteristics between DA converters occur.

In addition, when the pre-charge voltages and the current signals are supplied to the data lines, since the special circuit for use of feed of the pre-charge voltages is required, the configuration of the current mode DA converters become complicated. Particularly, when a voltage according to gray-scale levels to be represented is outputted as the pre-charge voltage, the data line driving circuit requires voltage mode DA converters, in addition to the current mode DA converters. There are problems such as increase of occupation area and power consumption of the data line driving circuit.

In consideration with the above problems, it is an object of the present invention to provide a current mode DA converter with a simple configuration, a data line driving circuit using the current mode DA converter, an electro-optical device, a driving method of the electro-optical device, and an electronic apparatus.

In order to achieve the above object, the present invention provides a DA converter comprising reference voltage generating means for generating a plurality of reference voltages; voltage selecting means for selecting one of the plurality of reference voltages, based on data inputted thereto, and outputting an analog voltage signal; and voltage to current converting means for converting the analog voltage signal into an analog current signal.

According to the present invention, since the reference of the DA conversion is set by a voltage, it is not necessary to provide a plurality of current sources, thereby allowing a simple configuration of the current mode DA converter. Here, the reference voltage generating means may include a plurality of resistors and the plurality of reference voltages may be drawn out from junction points of the resistors. In this case, a passive element may not be used in the reference voltage generating means, thereby allowing a further simple configuration.

In addition, preferably, the DA converter further comprises voltage current selecting means for selecting one of the analog voltage signal and the analog current signal, based on a select control signal, and outputting the selected signal as an output signal instead of the analog current signal. In this case, the reference of the DA conversion is set by a voltage and may be used as other output forms such as a voltage output and a current output. As a result, a configuration can be further simplified, as compared to a combination of only the voltage mode DA converter and the current mode DA converter.

In addition, in the DA converter, preferably, the voltage to current converting means includes a transistor for outputting the analog current signal based on a voltage applied to a gate electrode of the transistor; and compensating means for compensating the analog voltage signal and applying the compensated analog voltage signal to the gate electrode of the transistor so that an effect of voltage to current conversion characteristics, which varies depending on a threshold voltage of the transistor, is cancelled out. In this case, since the analog voltage signal compensated such that an effect of the threshold voltage can be cancelled is applied to the gate electrode of the transistor for current output, the precision of the analog current signal can be improved.

In addition, in the DA converter, preferably, the voltage to current converting means includes gain adjusting means for adjusting a gain of the voltage to current conversion based on gain control data. In this case, it becomes possible to adjust the gain of the analog current signal.

In addition, the present invention provides a data line driving circuit connected to a plurality of data lines, comprising a plurality of DA converters provided corresponding to the plurality of data lines, respectively, wherein each of the DA converters comprises the above-mentioned DA converter. With this data line driving circuit, since the reference of the DA conversion is set by a voltage, it is not necessary to provide a plurality of current sources, thereby allowing a simple configuration of the current mode DA converter and, moreover, a simple configuration of the data line driving circuit.

In addition, the present invention provides a data line driving circuit connected to a plurality of data lines, comprising a plurality of DA converters provided corresponding to the plurality of data lines, respectively; and reference voltage generating means for generating a plurality of reference voltages and supplying the plurality of reference voltages to the plurality of DA converters, respectively, wherein each of the plurality of DA converters includes voltage selecting means for selecting one of the plurality of reference voltages, based on image data, and outputting the selected reference signal as an analog voltage signal; and voltage to current converting means for converting the analog voltage signal into an analog current signal.

According to the present invention, when the current signal is applied as an output to the data lines, the reference of the DA conversion can be set by a voltage. If the reference of the DA conversion is set by a current, the plurality of current sources is required for each DA converter, thereby increasing a circuit size. On the contrary, in the present invention, since the reference of the DA conversion is set by a voltage, a configuration can be significantly simplified.

In the data line driving circuit, preferably, each of the plurality of DA converters includes voltage current selecting means for selecting one of the analog voltage signal and the analog current signal, based on a select control signal, and outputting the selected signal to the data lines. According to the present invention, the data line driving circuit can switch over a signal outputted to the data lines between the analog voltage signal and the analog current signal.

In addition, the present invention provides an electro-optical device comprising the above described data line driving circuit; and control means for controlling the voltage current selecting means to output the analog voltage signal during a first interval from a start of one horizontal scan period until a predetermined time elapses, generating a signal for controlling the voltage current selecting means to output the analog current signal during a second interval until the one horizontal scan period ends after the first interval ends, and supplying the signal for controlling the voltage current selecting means to the voltage to current converting means of the plurality of DA converters, as the select control signal, respectively.

According to the present invention, the analog voltage signal according to image data can be outputted before the analog current signal according to the image data is outputted to any data line. Accordingly, the data line can be pre-charged according to the image data.

In addition, the present invention provides an electronic apparatus including the above described electro-optical device. The electronic apparatus includes, for example, a personal computer, a portable telephone, a personal digital assistant, an electronic still camera, etc.

Further, the present invention provides a method of driving an electro-optical device including a plurality of data lines, a plurality of scan lines, and pixel circuits provided at intersections of the data lines and the scan lines, respectively, the pixel circuits including electro-optical elements with brightness controlled depending on a current supplied from the data lines, wherein image data is converted into an analog voltage signal, the analog voltage signal is converted into an analog current signal, and, of the analog voltage signal and the analog current signal, the analog voltage signal is selected during a first interval from a start of one horizontal scan period until a predetermined time elapses, the analog current signal is selected during a second interval until the one horizontal scan period ends after the first interval ends, and the selected signals are supplied to the data lines.

According to the present invention, the analog voltage signal according to image data can be outputted before the analog current signal according to the image data is outputted to any data line. Accordingly, the data line can be pre-charged according to the image data.

DETAILED DESCRIPTION OF EMBODIMENTS

1. First Embodiment

Figure 1:
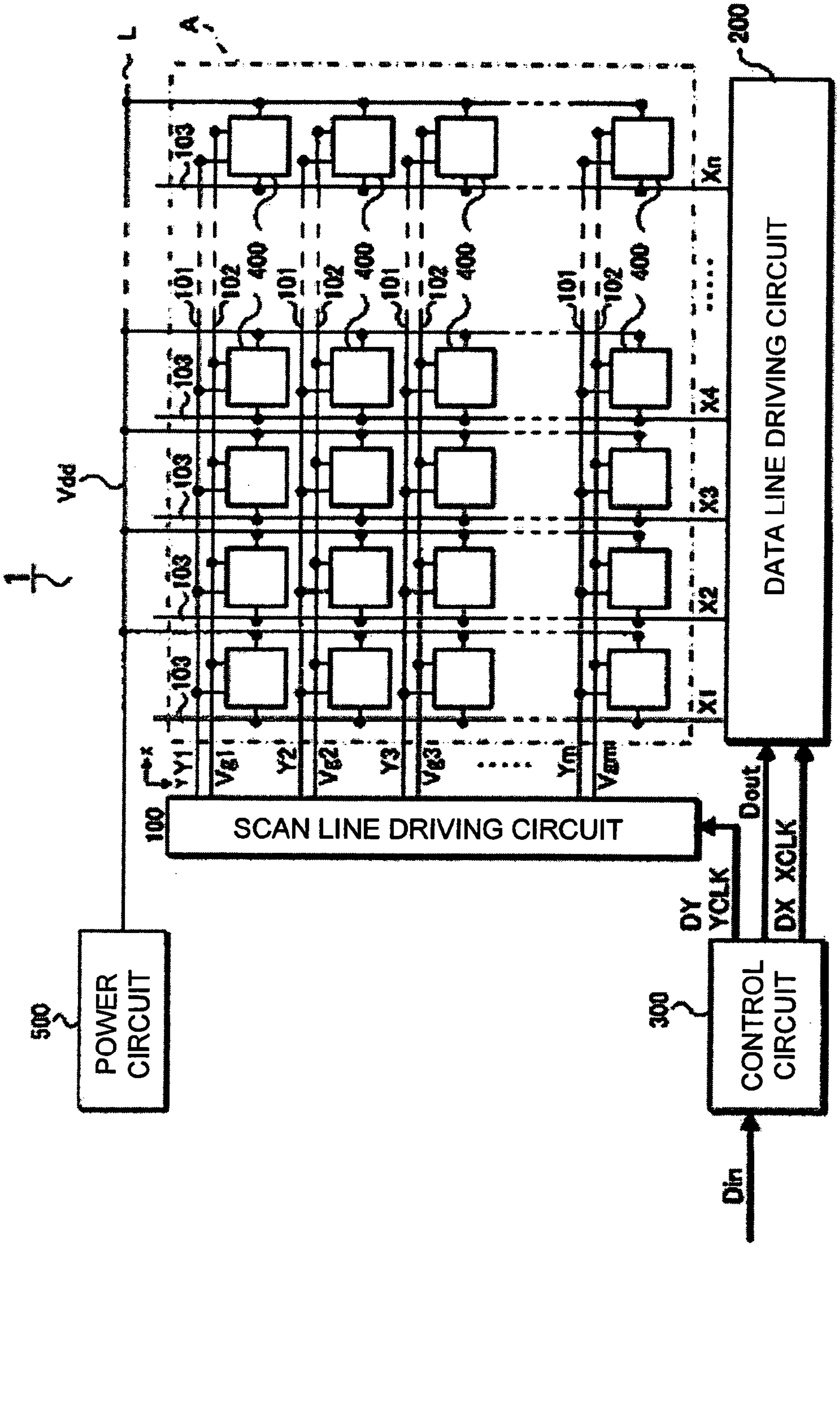
FIG. 1 is a block diagram illustrating a configuration of an electro-optical device 1 according to a first embodiment of the present invention.

FIG. 1 is a schematic block diagram of an electro-optical device 1 according to a first embodiment of the present invention. The electro-optical device 1 includes a pixel region A, a scan line driving circuit 100, a data line driving circuit 200, a control circuit 300, and a power circuit 500. Here, m scan lines 101 and m light emission control lines 102 are formed in parallel to the X direction in the pixel region A. In addition, n data lines 103 are formed in parallel to the Y direction perpendicular to the X direction. In addition, pixel circuits 400 are provided at intersections of the scan lines 101 and the data lines 103, respectively. Each pixel circuit 400 includes an OLED element. In addition, each pixel circuit 400 is supplied with a power voltage Vdd via a power line L.

Figure 2:
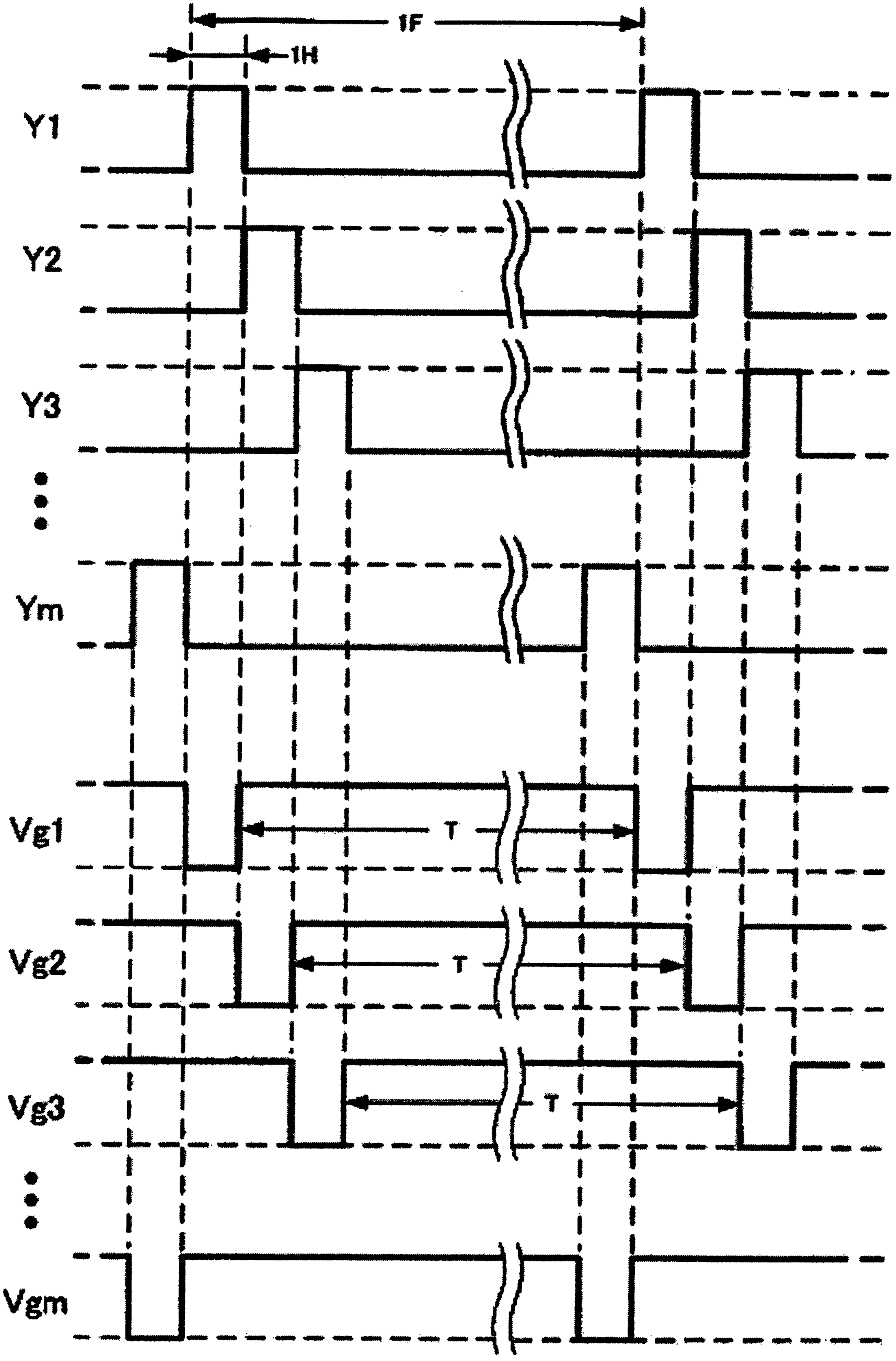
FIG. 2 is a timing chart illustrating operation of a scan line driving circuit in the electro-optical device 1 according to the first embodiment of the present invention.

The scan line driving circuit 100 generates scan signals Y1, Y2, Y3, . . . , Ym for sequentially selecting a plurality of scan lines 101, and simultaneously, generates light emission control signals Vg1, Vg2, Vg3, . . . , Vgm. The scan signals Y1 to Ym and the light emission control signals Vg1 to Vgm are generated by sequentially transmitting a Y transmission start pulse DY to the scan line driving circuit 100 in synchronization with a Y clock signal YCLK. The light emission control signals Vg1, Vg2, Vg3, . . . , Vgm are supplied to the pixel circuits 400 via the light emission control lines 102, respectively. FIG. 2 shows an example of a timing chart of the scan signals Y1 to Ym and the light emission control signals Vg1 to Vgm. A scan signal Y1 is applied to a first row scan line 101 as a pulse having a width corresponding to one horizontal scan period (1H) from an initial timing of one vertical scan period (1F). Thereafter, this pulse is sequentially shifted and is applied to second, third, . . . , m-th row scan lines 101 as scan signals Y2, Y3, . . . , Ym, respectively. In general, if a scan signal Yi applied to an i-th row scan line 101 (i is an integer satisfying a condition of $1 \leqq i \leqq m$) has an H level, it indicates that the i-th row scan line 101 is selected. In addition, for example, signals having inverted logics of the scan signals Y1, Y2, Y3, . . . , Ym are used as the light emission control signals Vg1, Vg2, Vg3, . . . , Vgm.

The data line driving circuit 200 supplies gray scale signals X1, X2, X3, Xn to pixel circuits 400 connected to selected scan lines 101, respectively, based on an output gray data Dout. In this example, the gray scale signals X1 to Xn are applied as current signals indicating gray scale brightness.

The control circuit 300 generates various control signals such as the Y clock signal YCLK, an X clock signal XCLK, an X transmission pulse DX, and the Y transmission pulse DY and outputs these generated control signals to the scan line driving circuit 100 and the data line driving circuit 200. In addition, the control circuit 300 performs an image process, such as gamma compensation, on input gray scale data Din supplied from the outside to generates output gray scale data Dout.

Figure 3:
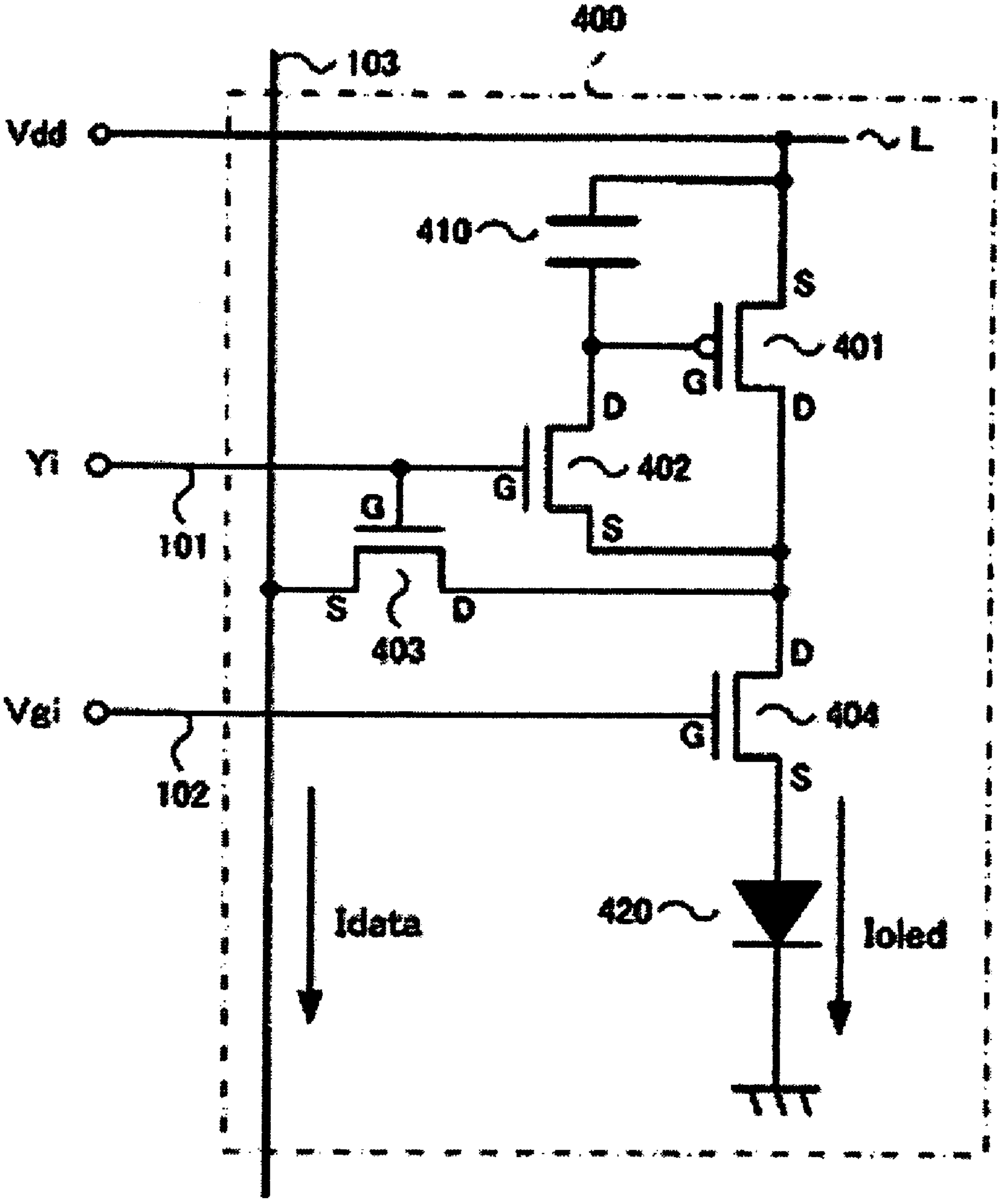
FIG. 3 is a circuit diagram illustrating a pixel circuit in the electro-optical device according to the first embodiment of the present invention.

Next, the pixel circuits 400 will be described. FIG. 3 is a circuit diagram of a pixel circuit 400. The pixel circuit 400 shown in the figure corresponds to an i-th row and is supplied with the power voltage Vdd. The pixel circuit 400 includes four TFTs 401 to 404, a capacitive element 410, and an OLED element 420. In a manufacturing process of the TFTs 401 to 404, a polysilicon layer is formed on a glass substrate using a laser anneal short. In addition, the OLED element 420 has an anode, a cathode, and a light emitting layer interposed between the anode and the cathode. In addition, the OLED element 420 emits light with brightness depending on a forward current. An organic EL material according to emitted colors is used as the light emitting layer. In a manufacturing process of the light emitting layer, the organic EL material is discharged, as droplets, from an inkjet type head and is dried.

A TFT 401 serving as a driving transistor is of p channel type, and TFTs 402 to 404 serving as switching transistors are a n channel type. The TFT 401 has a source electrode connected to the power line L and a drain electrode connected to a drain electrode of the TFT 403, a drain electrode of the TFT 404, and a source electrode of the TFT 402.

The capacitive element 410 has one end connected to the source electrode of the TFT 401 and the other end connected to a gate electrode of the TFT 401 and a drain electrode of the TFT 402. The TFT 403 has a gate electrode connected to the scan line 101 and a source electrode connected to the data line 103. In addition, the TFT 402 has a gate electrode connected to the scan line 101. On the other hand, the TFT 404 has a gate electrode connected to the light emission control line 102 and a source electrode connected to the anode of the OLED element 420. The gate electrode of the TFT 404 is applied with a light emission control signal Vgi via the light emission control line 102. In addition, the cathode of the OLED element 420 serving as a common electrode throughout the pixel circuit 400 has a lower (reference) potential for a power source.

With this configuration, when the scan signal Yi is in an H level, the n channel TFT 402 is turned on, and accordingly, the TFT 401 has the gate electrode and the drain electrode connected to each other, thereby serving as a diode. Also, when the scan signal Yi is in the H level, the n channel TFT 403 is turned on in the same way as the TFT 402. As a result, while a current Idata of the data line driving circuit 200 flows through a path including the power line L, the TFT 401, the TFT 403, and the data line 103 in this order, charges according to the potential of the gate electrode of the TFT 401 are stored in the capacitive element 410.

When the scan signal Yi is in an L level, both TFTs 403 and 402 are turned off. At this time, since an input impedance of the gate electrode of the TFT 401 is very high, the state of charge storage in the capacitive element 410 is not changed. A gate to source voltage of the TFT 401 is maintained as a voltage when the current Idata flows. In addition, when the scan signal Yi is in the L level, the light emission control signal Vgi is in the H level. On this account, the TFT 404 is turned on, and accordingly, an injection current Ioled according to a gate voltage of the TFT 401 flows between the source electrode and the drain electrode of the TFT 401. More specifically, this current flows through a path including the power line L, the TFT 401, the TFT 404, and the OLED element 420 in this order.

Here, the injection current Ioled flowing into the OLED element 420 is defined by the gate to source voltage of the TFT 401, which is a voltage maintained by the capacitive element 410 when the current Ioled flows through the data line 103 by the scan signal Yi with the H level. On this account, when the light emission control signal Vgi is in the H level, the injection current Ioled flowing into the OLED element 420 is approximately equal to the current Idata flown immediately before the flowing of the injection current Ioled. In this way, the pixel circuit 400 serves as a current programming type circuit since the light emission brightness is specified by the current Idata.

Figure 4:
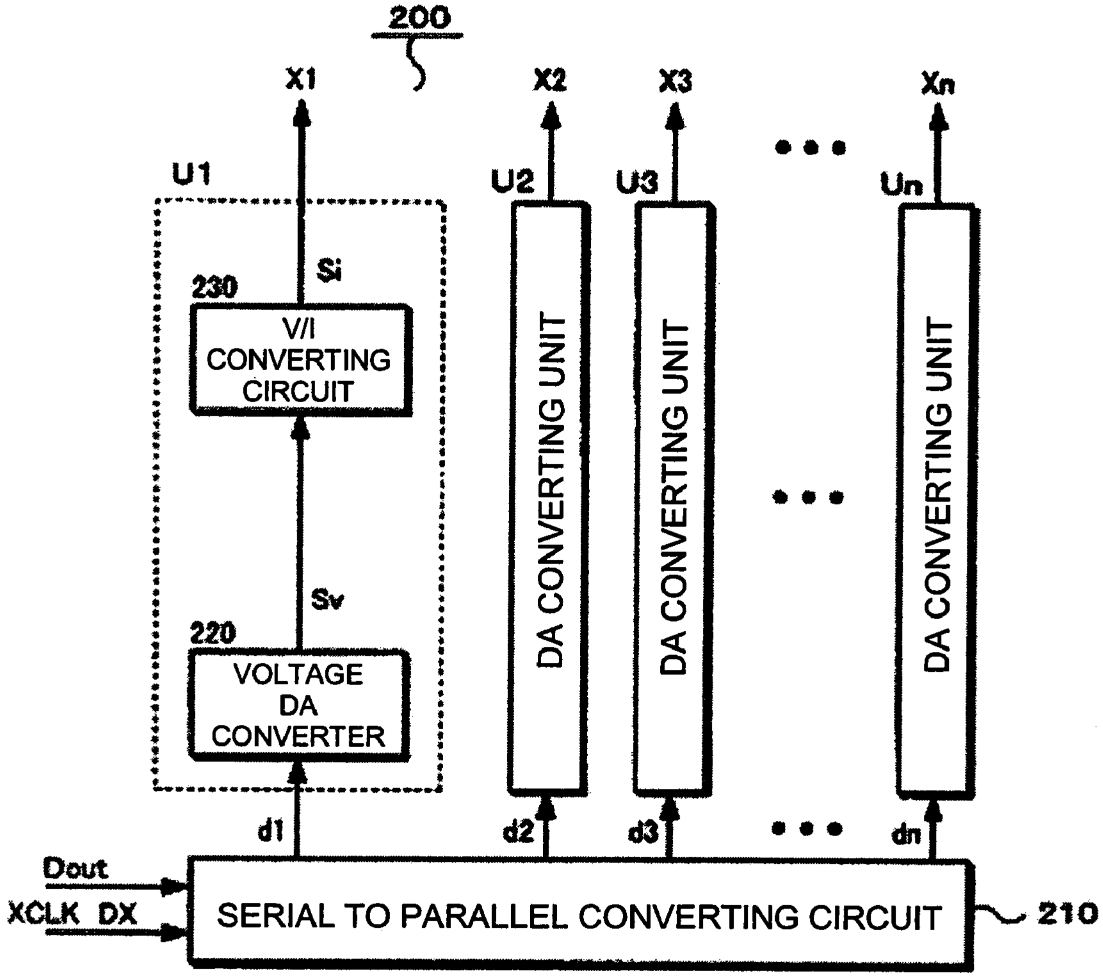
FIG. 4 is a block diagram illustrating a data line driving circuit in the electro-optical device according to the first embodiment of the present invention.

FIG. 4 is a block diagram illustrating a detailed configuration of the data line driving circuit 200. The data line driving circuit 200 includes a serial to parallel converting circuit 210 and n DA converting units U1, U2, . . . , Un. The serial to parallel converting circuit 210 includes a shift register and a latch circuit. The shift register transmits the X transmission start pulse DX sequentially in synchronization with the X clock signal XCLK to generate dot sequential latch signals. The latch circuit latches the output gray scale data Dout using the latch signals. By doing so, the serial output gray scale data Dout is converted in the parallel gray scale data d1, d2, . . . , dn.

The n DA converting units U1 to Un corresponding to the n data lines 102 convert the gray scale data d1, d2, . . . , dn from digital signals to analog signals and outputs the analog signals to the data lines 103 as the gray scale signals X1 to Xn. The DA converting units U1 to Un has the same configuration. Here, one DA converting unit U1 will be described, however, explanation of other remaining DA converting units U2 to Un will be omitted.

Figure 5:
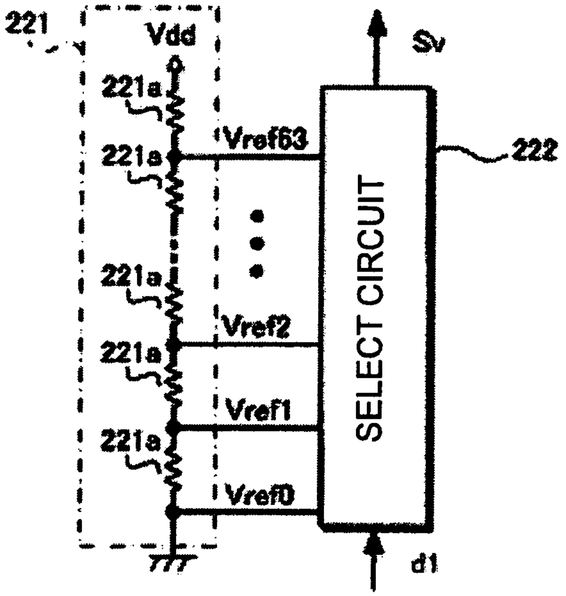
FIG. 5 is a block diagram illustrating a configuration of a voltage DA converter provided in the data line driving circuit of FIG. 4.

The DA converting unit U1 includes a voltage DA converter 220 and a V/I converting circuit 230. The voltage DA converter 220 converts gray scale data d1 applied as a digital signal into an analog voltage signal Sv. The voltage DA converter 220 is shown in detail in FIG. 5. As shown in this figure, the voltage DA converter 220 includes a reference voltage generating circuit 221 and a select circuit 222. The reference voltage generating circuit 221 includes a plurality of resistors 221*a* connected in series between the power voltage Vdd and a ground. The power voltage Vdd is divided by these resistors 221*a* to generate reference voltages Vref0, Vref1, . . . , Vref63. The gray scale data d1 is 6 bit data. Gray scale values indicated by the gray scale data d1 correspond to the reference voltages Vref0 to Vref63, respectively. The select circuit 222 selects one of the plurality of reference voltages Vref0 to Vref63 based on the gray scale data d1 and outputs it as the analog voltage signal Sv.

Figure 6:
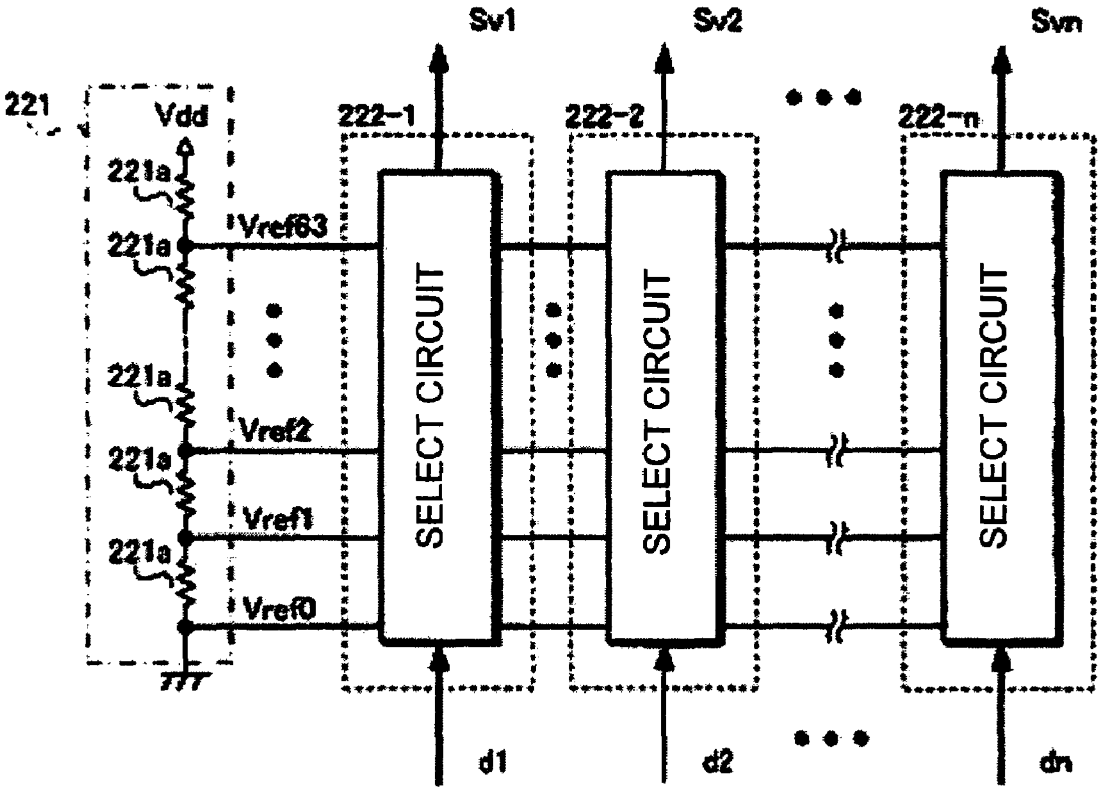
FIG. 6 is a block diagram illustrating another configuration of the voltage DA converter of FIG. 5.

In addition, n voltage DA converters 220 included in the n DA converting units U1 to Un may be configured as shown in FIG. 6. In this example, one reference voltage generating circuit 221 is connected in common to n voltage DA converters 220-1 to 220-*n*. In this way, by commonalizing the reference voltage generating circuit 221, deviations among the voltage DA converters 220-1 to 220-*n* can be eliminated.

Figure 7A:
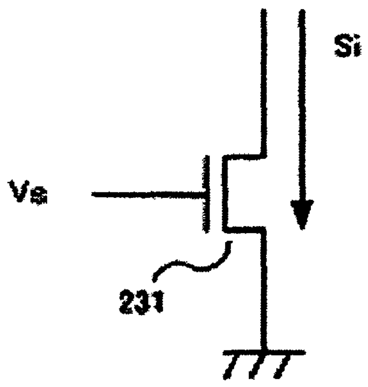
FIGS. 7A and 7B are circuit diagrams illustrating a configuration of a V/I converting circuit provided in the data line driving circuit of FIG. 4.
Figure 7B:
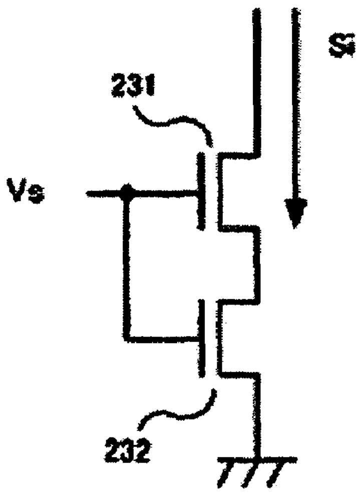

Next, the V/I converting circuit 230 serves to convert a voltage into a current. For example, the V/I converting circuit 230 can be configured using a transistor 231, as shown in FIG. 7(A). In this case, since the analog voltage signal Sv is applied to the transistor 231 as a gate to source voltage of the transistor 231, a current according to the analog voltage signal Sv flows as an analog current signal Si. In addition, as shown in FIG. 7(B), the V/I converting circuit 230 may be configured by connecting the transistor 231 and a transistor 232 in series. Such a configuration can reduce an effect of λ characteristics.

As described above, the DA converting units U1 to Un according to this embodiment convert the gray scale data as the digital signal into the analog voltage signal Sv using the voltage DA converters 220, and thereafter, convert the analog voltage signal Sv into the analog current signal Si. The voltage DA converters 220 for generating the reference voltages Vref0 to Vref63 are configured by only the plurality of resistors 221*a*, respectively, without requiring any transistors. In addition, the V/I converting circuit 230 including only one or two transistors in this example has quite a few active elements, as compared to the conventional current mode DA converters. Accordingly, the DA converting units U1 to Un according to this embodiment can provide a significantly simplified configuration.

In addition, as shown in FIG. 6, by connecting the reference voltage generating circuit 221 in common to the plurality of voltage DA converters 220-1 to 220-*n*, deviations of conversion characteristics among the DA converting units U1 to Un can be reduced. In addition, since the conventional data line driving circuit includes a plurality of current mode DA converters, it has been required to equalize the characteristics of the plurality of current sources included in the DA converters in order to reduce the deviations among the DA converters. For example, at least 6 current sources are required for the 6 bit DA converter. When that current sources of any DA converter are denoted by IG1, IG2, . . . , IG6, there is a need to reduce a deviation of the current source IG1, a deviation of the current source IG2, . . . , a deviation of the current source IG6, which are included in the plurality of DA converters, in order to deviations among the plurality of DA converters. On the contrary, in this embodiment, since the reference of the DA conversion is created by the reference voltage generating circuit 221, the deviations of the conversion characteristics among the DA converting units U1 to Un can be easily reduced.

2. Second Embodiment

Next, a second embodiment of the present invention will be described. An electro-optical device according to the second embodiment is different from the electro-optical device according to the first embodiment in that the former supplies a pre-charge voltage Vpre before supplying the analog current signal Si according to the gray-scale levels to be represented for the data lines 103. More specifically, the electro-optical device according to the second embodiment has the same configuration as the electro-optical device according to the first embodiment, except that the detailed configuration of the data line driving circuit 200 in the former is different from that in the latter and the control circuit 300 in the former generates a pre-charge control signal CTL.

Figure 8:
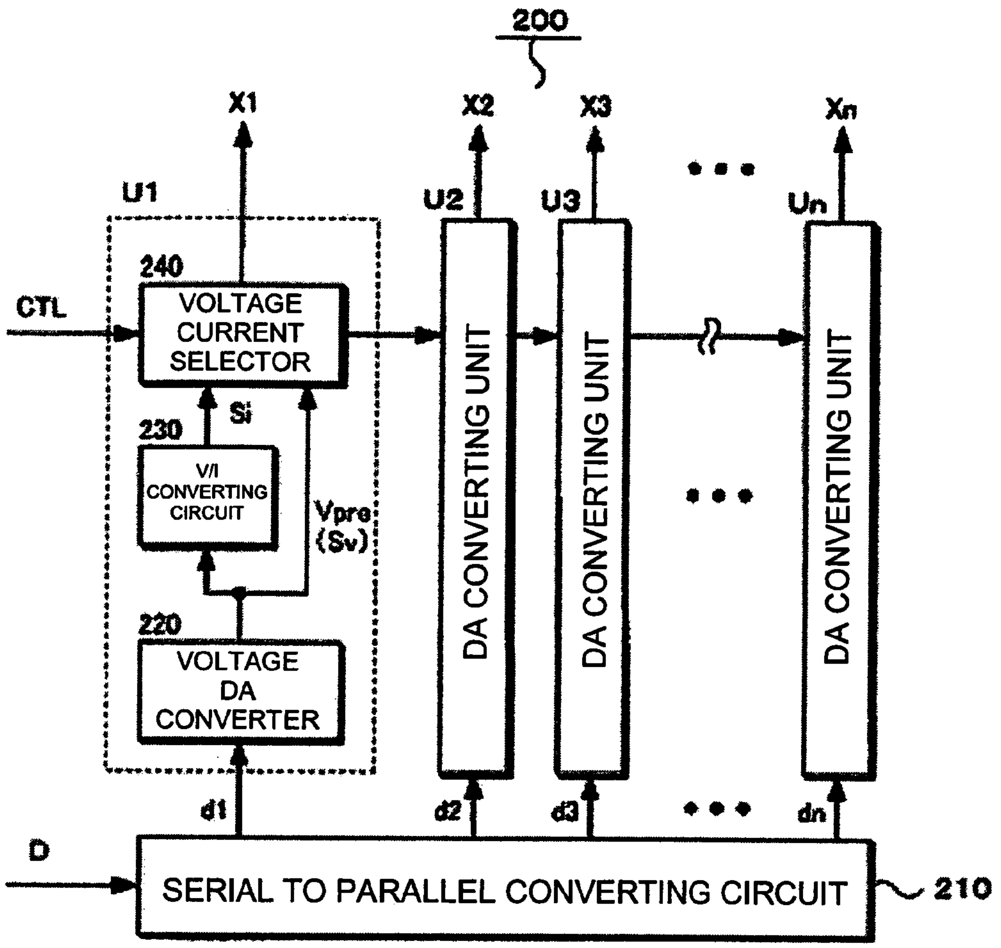
FIG. 8 is a block diagram illustrating a data line driving circuit used in an electro-optical device according to a second embodiment of the present invention.

FIG. 8 is a block diagram of the data line driving circuit 200 according to the second embodiment. As shown in this figure, each DA converting unit U1 to Un according to the second embodiment includes a voltage current selector 240. The voltage current selector 240 applies the analog voltage signal Sv to the data line 103 as the pre-charge voltage Vpre when the pre-charge control signal CTL has a high level, and applies the analog current signal Si to the data lines when the pre-charge control signal CTL has a low level.

Figure 9:
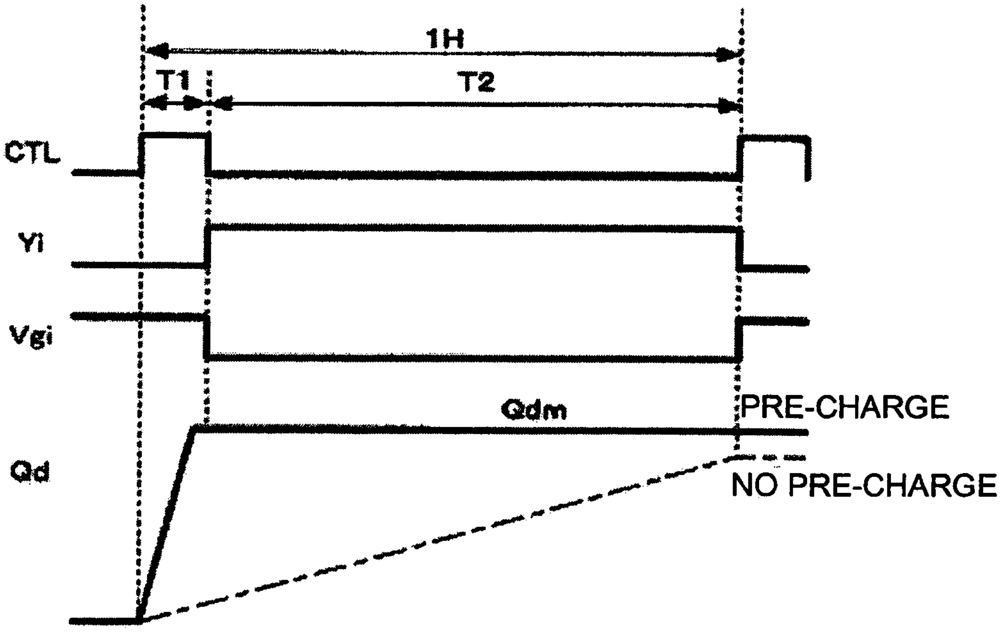
FIG. 9 is a timing chart illustrating operation of the data line driving circuit of FIG. 8.

With this data line driving circuit 200, it is possible to reduce time taken for current programming by charging or discharging the data lines 103 before the current programming is completed. FIG. 9 is a timing chart illustrating a pre-charge operation. In this example, before a programming operation is performed during an interval T2, the pre-charge control signal CTL has a high level during an interval T1 to perform a charge or discharge (pre-charge) operation for the data line 103. According to this pre-charge operation, charge quantity Qd of the data line 103 reaches a predetermined value according to the pre-charge voltage Vpre. In other words, the voltage of the data line 103 reaches a voltage approximately equal to the pre-charge voltage Vpre.

A chain line shown in FIG. 9 represents variation of charge quantity when the pre-charge operation is not used. In this case, even at a termination of the programming interval T2, the charge quantity of the data line 103 does not reach a charge quantity Qdm corresponding to a desired programming current value. Accordingly, there is a possibility that it is impossible to supply a compensate programming current to the pixel circuits 400 in order to program the current with correct gray-scale levels.

As described above, in this embodiment, it is possible to set correct light emission gray-scale levels for the pixel circuits 400 by performing the pre-charge operation to accelerate the charge or discharge of the data lines. In addition, the time taken for the current programming can be reduced, thereby achieving a high speed driving control of the OLED elements 420. In addition, since the pre-charge voltage Vpre (Sv) according to the gray scale data d1 to dn is generated in the course of converting the gray scale data d1 to dn into the analog current signal Si, it not necessary to provide a separate circuit for generating the pre-charge voltage Vpre.

3. Modifications

The present invention is not limited to the above-described embodiments, and may have various modifications, for example, as described below.

Figure 10:
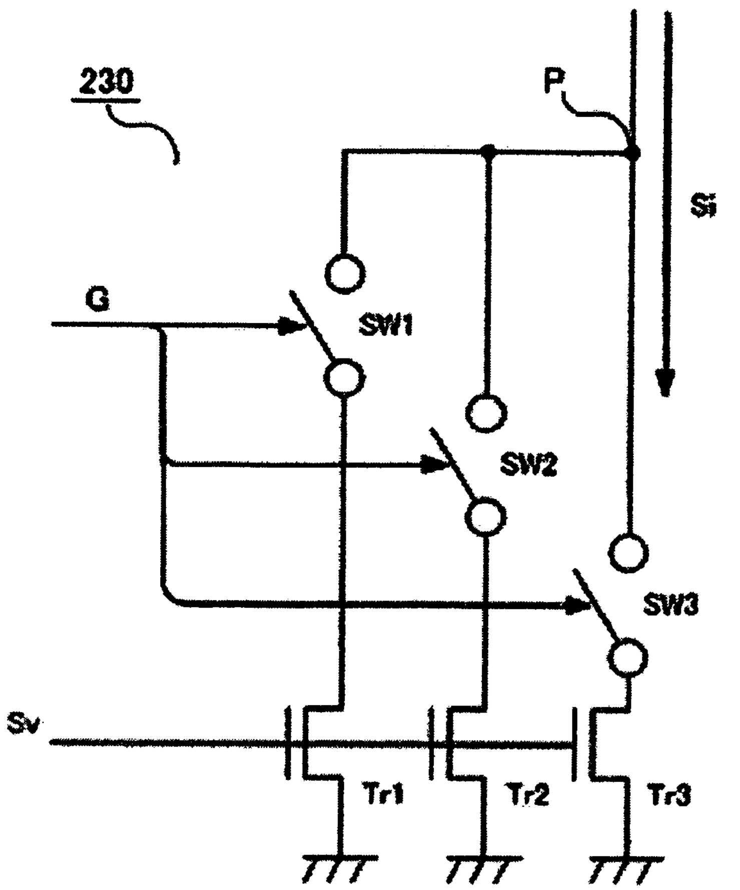
FIG. 10 is a circuit diagram illustrating a configuration of a V/I converting circuit having a gain adjustment function according to a modification of the present invention.

(1) In the above-described first and second embodiments, the V/I converting circuit 230 may have a function of adjusting a gain of the voltage-current conversion. In this case, the V/I converting circuit 230 may be configured, for example, as shown in FIG. 10. The V/I converting circuit 230 includes three switches SW1 to SW3 having one ends connected to a junction point P and three transistors Tr1 to Tr3 provided between the other ends of the switches SW1 to SW3 and a ground. The analog voltage signal Sv is applied to gates electrodes of the transistors Tr1 to Tr3. In addition, the gate width of the transistors Tr1 to Tr3 is set with a ratio of 1:2:4. A 3-bit gain adjusting signal G is applied to the switches SW1 to SW3. The gain adjusting signal G is supplied from the control circuit 300. With this configuration, since the voltage-current conversion gain can be adjusted, it is possible to perform a brightness adjustment of the entire panel using the gain adjusting signal G. In addition, in the case of an electro-optical device for color display, the gain adjusting signal G may be independently set for each RGB to adjust a white balance. In addition, in the case where the data line driving circuit 200 is configured by a plurality of driver Ics, the gain adjusting signal G may be independently set for each driver IC to reduce a deviation of brightness among the driver ICS.

(2) In the V/I converting circuit 230 including the transistor 231, according to the above described first and second embodiments, the voltage-current conversion characteristics are affected by a threshold voltage of the transistor 231. So, the V/I converting circuit 230 may have a function of compensating for the threshold voltage of the transistor 231. Such a V/I converting circuit 230 may have two aspects as described below.

Figure 11:
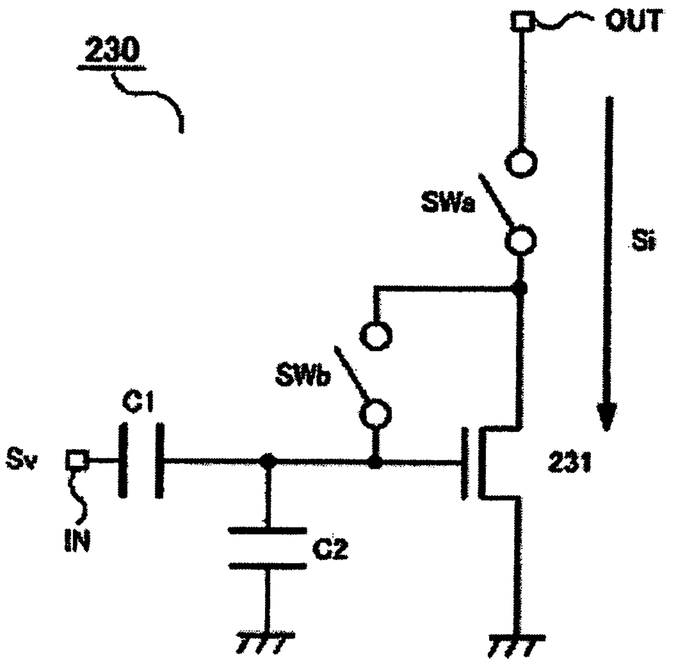
FIG. 11 is a circuit diagram illustrating a configuration of a V/I converting circuit having a function of compensating for a threshold voltage according to a modification of the present invention.

FIG. 11 shows a first aspect of a modified V/I converting circuit. This V/I converting circuit 230 is a self-compensatory circuit for feeding back the threshold voltage of the transistor 231 to a gate electrode of the transistor 231. More specifically, a switch SWa is connected to a source electrode of the transistor 231, and a switch SWb is provided between the source electrode and the gate electrode of the transistor 231. In addition, the analog voltage signal Sv is applied to the gate electrode of the transistor 231 via a coupling capacitor C1, and a storage capacitor C2 is provided between the gate electrode of the transistor 231 and a ground. The switch SWa, the switch SWb, the coupling capacitor C1, and the storage capacitor C2 serve as compensation means for compensating the analog voltage signal Sv and applying it to the gate electrode of the transistor 231 so that an effect of the voltage-current conversion characteristics varied depending on the threshold voltage of the transistor 231 is cancelled out.

Operation of the V/I converting circuit 230 is generally divided into a reset operation and a current output operation. In the reset operation, firstly, the switches SWa and SWb are turned on, and a potential of an output terminal OUT becomes above a potential of a ground potential plus the threshold voltage. Thus, the transistor 231 is reliably turned on. At this time, a potential of an input terminal has the ground potential. Secondly, the switch SWa is turned off. At this time, a gate to drain voltage of the transistor 231 becomes the threshold voltage. Thirdly, the switch SWb is turned off. At this time, a potential of the gate electrode of the transistor 231 is maintained by the storage capacitor C2.

In the current output operation, the analog voltage signal Sv is applied to the input terminal IN. Then, the gate potential of the transistor 231 is changed as Equation 1 due to the coupling capacitor C1. In Equation 1, ΔVg is the amount of variation of the gate potential and Cox is gate capacitance of the transistor 231.

$$\Delta Vg = Sv \cdot C1/(C1+C2+\mathrm{Cox}) \quad \text{[Equation 1]}$$

Next, under this state, when the switch SWa is turned on, the analog current signal Si defined by Equation 2 is outputted from the transistor 231. In Equation 2, Vgs is a gate to source voltage of the transistor 231 and Vth is the threshold voltage of the transistor 231.

$$\begin{aligned} Si &= (1/2)\cdot\beta(Vgs - Vth)^2 \\ &= (1/2)\cdot\beta(Vth + \Delta Vg - Vth)^2 \\ &= (1/2)\cdot\beta\{Sv\cdot C1/(C1 + C2 + Cox)\}^2 \end{aligned} \quad \text{[Equation 2]}$$

As apparent from Equation 2, the analog current signal Si is independent of the threshold voltage Vth of the transistor 231.

Figure 12:
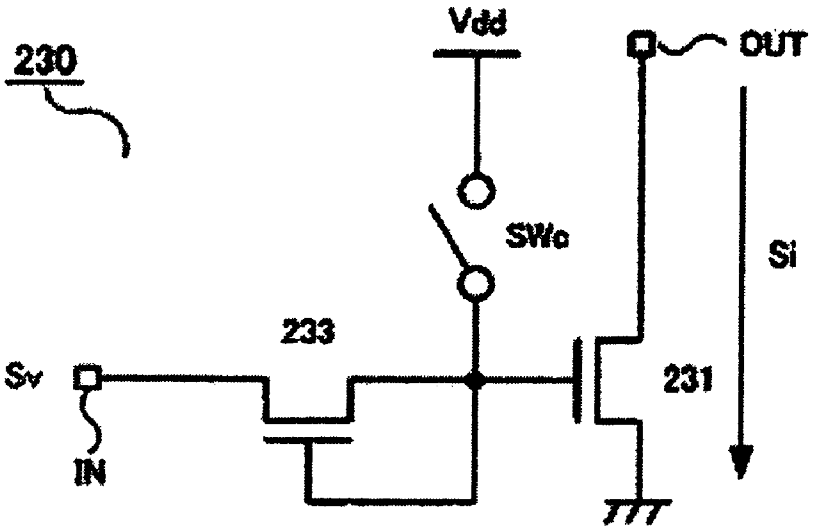
FIG. 12 is a circuit diagram illustrating another configuration of a V/I converting circuit having a function of compensating for a threshold voltage according to a modification of the present invention.

FIG. 12 shows a second aspect of a modified V/I converting circuit. This V/I converting circuit 230 is a compensatory transistor insertion type circuit. More specifically, a drain electrode of a transistor 233 is connected to the gate electrode of the transistor 231, and a switch SWc is provided between the junction point between the drain electrode of the transistor 233 and the gate electrode of the transistor 231 and the power voltage Vdd. A gate electrode and the drain electrode of the transistor 233 are short therebetween and have a function of compensating for the threshold voltage of the transistor 231. The switch SWc and the transistor 233 serve as compensation means for compensating the analog voltage signal Sv and applying it to the gate electrode of the transistor 231 so that an effect of the voltage-current conversion characteristics varied depending on the threshold voltage of the transistor 231 is cancelled out. In the following description, Vth1 represents the threshold voltage of the transistor 231 and Vth2 represents the threshold voltage of the transistor 233.

Operation of the V/I converting circuit 230 is generally divided into a reset operation and a current output operation. In the reset operation, firstly, the switches SWc is turned on, and a potential of the drain electrode of the transistor 233 becomes above a potential of the analog voltage signal Sv plus the threshold voltage Vth by connecting the drain electrode of the transistor 233 to the power voltage Vdd. Thus, the transistor 233 is reliably turned on.

In the current output operation, the switch SWc is turned off. Then, a voltage of the analog voltage signal Sv plus the threshold voltage Vth of the transistor 233 is inputted to the gate electrode of the transistor 231. At this time, the analog current signal Si outputted from the transistor 231 can be expressed by Equation 3.

$$Si = (1/2)\cdot\beta(Sv + Vth2 - Vth1)^2 \quad \text{[Equation 3]}$$

Here, the transistor 231 and the transistor 233 are manufactured using the same process and have the same transistor size. On this account, the threshold voltage Vth1 is equal to the threshold voltage Vth2. Accordingly, the analog current signal Si is given by Equation 4.

$$Si = (1/2)\cdot\beta\cdot Sv^2 \quad \text{[Equation 4]}$$

As apparent from Equation 4, the analog current signal Si is not affected by the threshold voltage Vth1 of the transistor 231.

As described above, although the transistor of the V/I converting circuit 230 becomes ununiform in the manufacturing process, the analog voltage signal Sv can be converted into the analog current signal Si with high precision by excluding the effect of the threshold voltage of the transistor from the voltage-current conversion characteristics.

4. Applications

Figure 13:
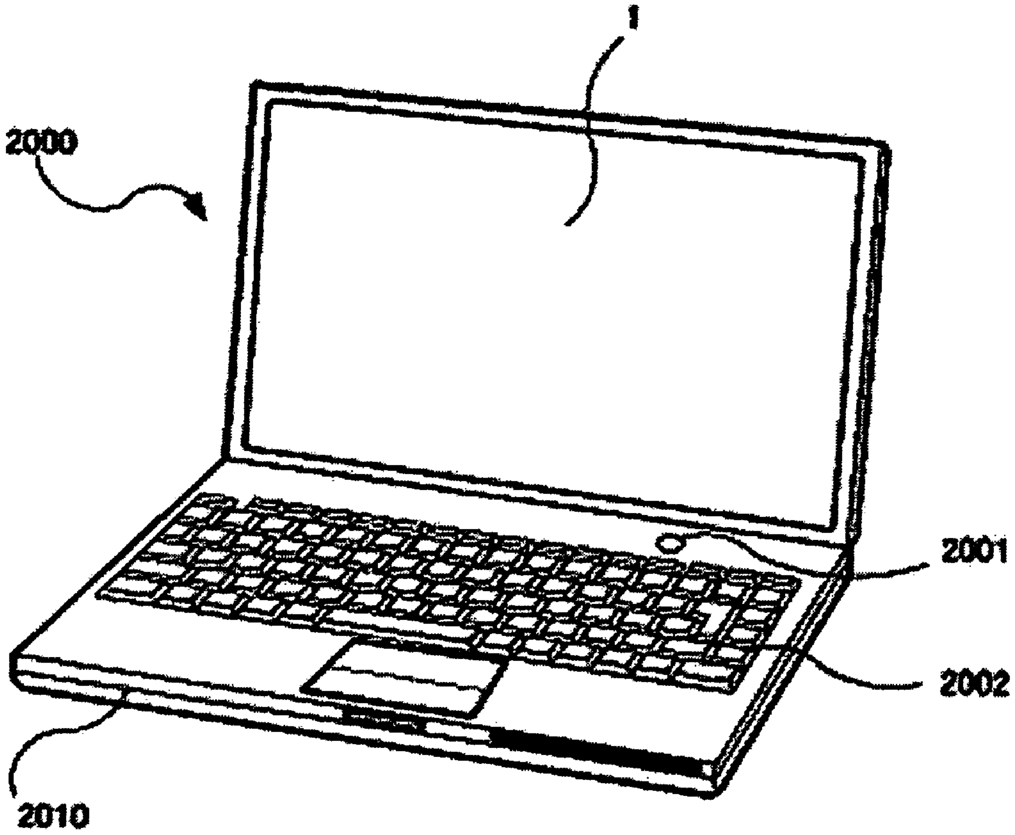
FIG. 13 is a perspective view illustrating a configuration of a mobile personal computer to which the electro-optical device according to the present invention is applied.

Next, electronic apparatuses to which the electro-optical device 1 according to the above-described embodiments and modifications is applied will be described. FIG. 13 shows a configuration of a mobile personal computer to which the electro-optical device 1 is applied. A personal computer 2000 includes the electro-optical device 1 as a display unit and a body 2010. The body 2010 includes a power switch 2001 and a keyboard 2002. Since the electro-optical device uses the OLED element 420, it can display a screen having a wide viewing angle through which images are well visible.

Figure 14:
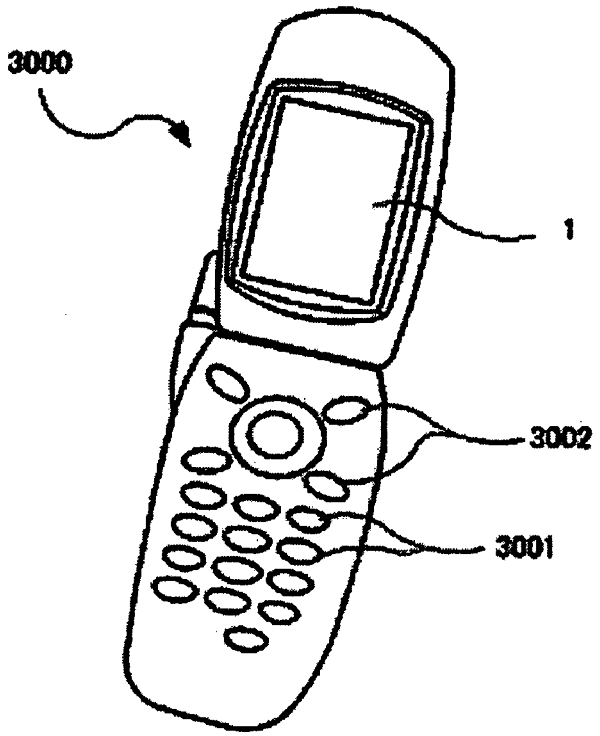
FIG. 14 is a perspective view illustrating a configuration of a portable telephone to which the electro-optical device according to the present invention is applied.

FIG. 14 shows a configuration of a portable telephone to which the electro-optical device 1 is applied. A portable telephone 3000 includes a plurality of manipulating buttons 3001, several scroll buttons 3002, and the electro-optical device 1 as a display unit. A screen displayed on the electro-optical device 1 is scrolled by manipulating the scroll buttons 3002.

Figure 15:
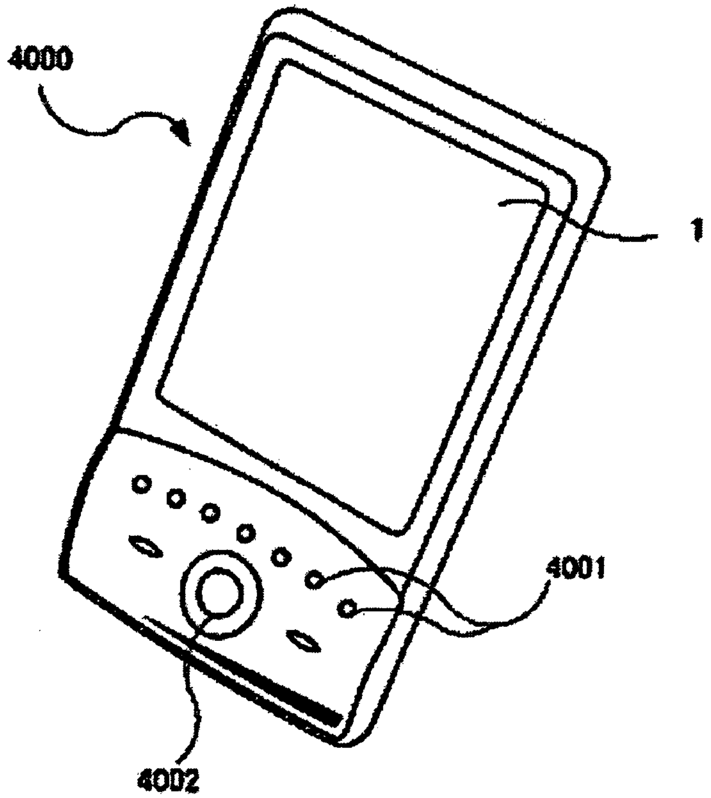
FIG. 15 is a perspective view illustrating a configuration of a personal digital assistant to which the electro-optical device according to the present invention is applied.

FIG. 15 shows a configuration of a personal digital assistant (PDA) to which the electro-optical device 1 is applied. A PDA 4000 includes a plurality of manipulating buttons 4001, a power switch 4002, and the electro-optical device 1 as a display unit. Various kinds of information such as an address book or a schedule book are displayed on the electro-optical device 1 by manipulating the power switch 4002.

Further, in addition to ones shown in FIGS. 13 to 15, the electronic apparatuses to which the electro-optical device 1 is applied may include digital cameras, liquid crystal television sets, view finder type or monitor direct-view type video tape recorders, car navigators, pagers, electronic pocket notebooks, calculators, word processors, workstations, video telephones, point-of-sale (POS) terminals, scanners, apparatuses equipped with touch panels, etc. Further, the above-described electro-optical device can be applied as display units of the above-mentioned electronic apparatuses.

What is claimed is:

1. A DA converter comprising:

reference voltage generating means for generating a plurality of reference voltages;

voltage selecting means for selecting one of the plurality of reference voltages, based on data inputted thereto, and outputting an analog voltage signal; and voltage to current converting means for converting the analog voltage signal into an analog current signal, the voltage to current converting means including:

a transistor for outputting the analog current signal based on a voltage applied to a gate electrode of the transistor; and compensating means for compensating the analog voltage signal and applying the compensated analog voltage signal to the gate electrode of the transistor so that an effect due to voltage to current conversion characteristics, which varies depending on a threshold voltage of the transistor, is cancelled out.

2. The DA converter according to claim 1, wherein the voltage to current converting means includes gain adjusting means for adjusting a gain of the voltage to current conversion based on gain control data.

3. A data line driving circuit connected to a plurality of data lines, comprising:

a plurality of DA converters provided corresponding to the plurality of data lines, wherein each of the DA converters comprises the DA converter according to claim 1.

4. A data line driving circuit connected to a plurality of data lines, comprising:

a plurality of DA converters provided corresponding to the plurality of data lines; and reference voltage generating means for generating a plurality of reference voltages and supplying the plurality of reference voltages to the plurality of DA converters, respectively, wherein each of the plurality of DA converters includes:

voltage selecting means for selecting one of the plurality of reference voltages, based on image data, and outputting the selected reference signal as an analog voltage signal; and voltage to current converting means for converting the analog voltage signal into an analog current signal, the voltage to current converting means includes:

a transistor for outputting the analog current signal based on a voltage applied to a gate electrode of the transistor; and compensating means for compensating the analog voltage signal and applying the compensated analog voltage signal to the gate electrode of the transistor so that an effect due to voltage to current conversion characteristics, which varies depending on a threshold voltage of the transistor, is cancelled out.

5. The data line driving circuit according to claim 3, wherein each of the plurality of DA converters includes voltage current selecting means for selecting one of the analog voltage signal and the analog current signal, based on a select control signal, and outputting the selected signal to the data lines.

6. An electro-optical device comprising:

the data line driving circuit according to claim 5; and control means for controlling the voltage current selecting means to output the analog voltage signal during a first interval from a start of one horizontal scan period until a predetermined time elapses, generating a signal for controlling the voltage current selecting means to output the analog current signal during a second interval until the one horizontal scan period ends after the first interval ends, and supplying the signal for controlling the voltage current selecting means to the voltage to current converting means of the plurality of DA converters, as the select control signal, respectively.

7. An electronic apparatus including the electro-optical device according to claim 6.

8. A method of driving an electro-optical device comprising a plurality of data lines, a plurality of scan lines, and pixel circuits provided at intersections of the data lines and the scan lines, the pixel circuits including electro-optical elements with brightness controlled depending on a current supplied from the data lines, the method comprising:

converting image data into an analog voltage signal, converting the analog voltage signal into an analog current signal, selecting the analog voltage signal, from the analog voltage signal and the analog current signal, during a first interval from a start of one horizontal scan period until a predetermined time elapses, selecting the analog current signal during a second interval until the one horizontal scan period ends after the first interval ends, and the selected signals are supplied to the data lines, outputting from a transistor the analog current signal based on a voltage applied to a gate electrode of the transistor, and compensating the analog voltage signal and applying the compensated analog voltage signal to the gate electrode of the transistor so than an effect due to voltage to current conversion characteristics, which varies depending on a threshold voltage of the transistor, is canceled out.

* * * * *